(12) United States Patent
De La Torre-Bueno et al.

(10) Patent No.: US 7,873,193 B2
(45) Date of Patent: Jan. 18, 2011

(54) SERIAL SECTION ANALYSIS FOR COMPUTER-CONTROLLED MICROSCOPIC IMAGING

(75) Inventors: Jose De La Torre-Bueno, Vista, CA (US); Cynthia B. Perz, Huntington Beach, CA (US); Robert T. Ellis, Dana Point, CA (US)

(73) Assignee: Carl Zeiss MicroImaging GmbH, Jena (DE)

( * ) Notice: Subject to any disclaimer, the term of this patent is extended or adjusted under 35 U.S.C. 154(b) by 980 days.

(21) Appl. No.: 11/472,820

(22) Filed: Jun. 21, 2006

(65) Prior Publication Data

US 2007/0280517 A1    Dec. 6, 2007

Related U.S. Application Data

(60) Provisional application No. 60/692,731, filed on Jun. 21, 2005.

(51) Int. Cl.
*G06K 9/00* (2006.01)
(52) U.S. Cl. ..................... 382/128; 382/284
(58) Field of Classification Search .............. 382/128, 382/284
See application file for complete search history.

(56) References Cited

U.S. PATENT DOCUMENTS

| | | | | |
|---|---|---|---|---|
| 6,618,511 B1 * | 9/2003 | Mancuso et al. | ............ | 382/293 |
| 7,035,478 B2 * | 4/2006 | Crandall et al. | ............. | 382/284 |
| 7,415,142 B2 * | 8/2008 | Breeuwer | .................... | 382/128 |
| 2004/0170309 A1 * | 9/2004 | Hughes et al. | .............. | 382/128 |
| 2004/0202357 A1 | 10/2004 | Perz et al. | | |

OTHER PUBLICATIONS

Cesmeli et al, "An Automated Temproal Alignment Technique for the Translation and Rotational Correction of Digital Radiographic images of Bjork-Shiley Heart Valves", IEEE Comp. Soc. Press, US, Sep. 5, 1993, pp. 619-622, XP 010128823 ISBN: 0-8186-5470-8.*

* cited by examiner

*Primary Examiner*—Tom Y Lu
(74) *Attorney, Agent, or Firm*—Patterson Thuente Christensen Pedersen, P.A.

(57) ABSTRACT

Automated projection of serial section images in microscopic imaging systems. A computer-controlled microscope that is connected electrically to a controller that has a display device. A batch of serial section slides includes a series of serial section slides, each of which has a microscope slide, a sample, and an interesting area. If one of the images is misregistered, then the images may be transformed.

10 Claims, 5 Drawing Sheets

SERIAL SECTION ANALYSIS FOR COMPUTER-CONTROLLED MICROSCOPIC IMAGING

CROSS-REFERENCE TO RELATED APPLICATIONS

This application claims priority to U.S. Application Ser. No. 60/692,731, filed on Jun. 21, 2005. The disclosure of the prior application is considered part of (and is incorporated by reference in) the disclosure of this application.

BACKGROUND

Anatomic pathology studies sections and images of human tissue. A pathologist or other professional typically inspects and analyzes a section of human tissue. The inspection may be carried out by marking a sample with a stain, where that stain reveals a visual indicator of diagnostic significance. The same tissue is placed on the slide for viewing under a microscope. The microscope may be manually observed, or may be observed by an automated imaging system.

Capturing areas of the slide sample at high magnification is necessary for examining minute features of the tissue. However, even obtaining a single image of an entire tissue specimen at high magnification e.g. 40×, requires significant computer storage space and lengthy retrieval times.

Sequential slices of tissue, known as serial sections, may include sections of tissues that are obtained by needle biopsies, tissue microarrays, or slices taken from the same block of tissue. These sequential slices are often placed across one or more microscope slides to be viewed serially. A pathologist can observe and/or perform various tests on the array of serial sections.

For example, a pathologist may be interested in whether a particular stain appears in the same region across each tissue sample. Another example is that a pathologist may be interested in the effect that different stains have across the same area of each tissue sample. This system may also be used for three-dimensional image reconstruction of a block of tissue.

Precision is often an issue. One common way of preparing serial sections slides involves embedding tissue in wax, sectioning it at specified thicknesses e.g. 4 microns, and/or allowing the sections to float on a water bath. Techniques are used to keep the tissue in the same general location across each slide. However, errors may cause the tissue section to be inconsistently located—e.g., located in a different location on the slide, rotated or flipped, stretched, or having different size cut. The tissue may also be torn or have a distorted shape.

An area of significance on one slide of a serial section of slides, may be located in a different area on a different slide.

DETAILED DESCRIPTION

The present application teaches an automated means of resolving positional differences within serial sections samples and a slide batch to allow for automated analysis.

A serial section analysis of tissue sections attempts to slice samples into similar sizes and to position them in a consistent or predictable pattern across multiple "serial" microscope slides. Each serial section is preferably placed on its own slide in the same location. However, when the slides are inconsistently located, pathologists or researchers looking at images of each slide often find themselves searching across serial sections for a similar characteristic, such as a specific color, size, shape, etc.

For serial section slides containing samples from the same block of tissue, the inventors recognize that an indicator of diagnostic significance may appear in the same, or nearly the same, location from one slice of serial section tissue to the next. For example, a series of serial sections stained with Hematoxylin & Eosin (H&E), a favored stain used for identifying tumors, will cause areas of tumor to show up darker than normal tissue. Subsequent areas of interest would also exhibit dark color characteristics. Therefore, it is important in serial section analysis to identify a region of a first tissue sample and correspond that region to other tissue samples in the array. An embodiment uses a location of significance of one serial section to find areas for analysis on subsequent serial sections.

An embodiment describes a system for and method of automated projection of serial section images for microscopic imaging systems. The system of the present embodiment collects images of a batch of serial section slides and then calculates a series of transformations from one slide to the next. During a subsequent review, a user of the imaging system identifies an area of significance on one serial section slide that should be identified also across the batch of slides. The precalculated transformations are then applied to each slide in the batch, in order to project the same area. The resulting projections are displayed to the user and/or used for designating areas for automated image analysis.

Figure 1:
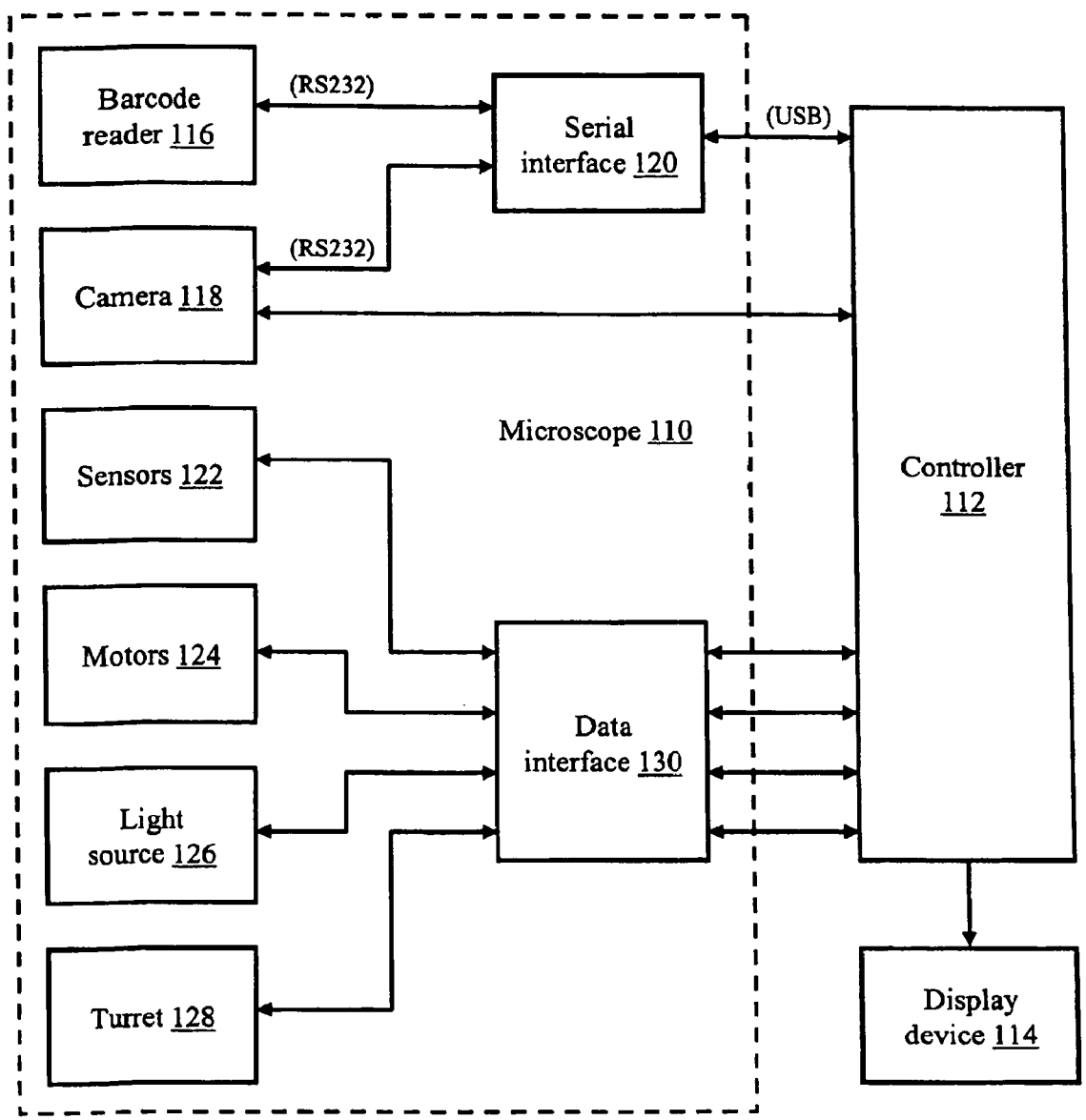
FIG. 1 illustrates a block diagram of a microscope imaging system of an embodiment.

FIG. 1 illustrates a block diagram of a microscope imaging system 100 which is representative of a generalized imaging system that is suitable for use with the optimized serial registration techniques that are described in more detail in FIGS. 2 through 5. Microscope imaging system 100 includes a microscope 110 that is connected electrically to a controller 112 that has a display device 114. Controller 112 is representative of any special-purpose or conventional computer, such as a desktop, laptop, or host computer. Controller 112 is loaded with the appropriate software for controlling microscope imaging system 100, such as software for running image-processing algorithms and image analysis algorithms. Display device 114 is any special-purpose or conventional computer display device that outputs graphical images to a user.

Microscope 110 is a computer-controlled microscope suitable for use in an automated imaging system. An example of microscope 110 is an Automated Cellular Imaging System (ACIS), manufactured by Clarient Inc (Aliso Viejo, Calif.). Microscope 110 further includes a barcode reader 116, a camera 118, a serial interface 120, one or more sensors 122, one or more motors 124, a light source 126, a turret 128, and a data interface 130.

Barcode reader 116 is a standard barcode reader that is capable of detecting an identifier. In the embodiment of a microscope imaging system 100, the identifier is on a standard microscope slide (described in more detail in reference to FIG. 2). Camera 118 is a digital camera that has selectable resolution capabilities. Camera 118 is mounted upon turret 128 of microscope 110, such that its aperture is aligned with the field of view (FOV) of any lens associated with turret 128. Barcode reader 116 and camera 118 feed electrical inputs of serial interface 120, which facilitates a serial communication link between these elements and controller 112. For example, serial-interface 120 provides a USB connection to controller 112. Furthermore, camera 118 provides a direct video output connect to a video card within controller 112 that gathers the image data from camera 118 for processing. Sensors 122 include, but are not limited to, position sensors, temperature sensors, light intensity sensors, or optical encoders detecting the state of the system. Motors 124 can include conventional servomotors, stepper motors, nanomovers, or the like, that are associated with the motion control of microscope 110, such as those for rotating the appropriately powered lens within the optical path of microscope 110, for adjusting focus, or for controlling an automated X, Y stage.

Light source 126 is any suitable light source that is used for appropriately illuminating the FOV of microscope 110 to allow creation of a digital image of that FOV. Turret 128 is a conventional motor-driven microscope turret upon which is mounted a set of lenses of varying power that may be rotated into the optical path of microscope 110. Turret 128 is also suitably controlled to provide the desired focus. Sensors 122, motors 124, light source 126, and turret 128 feed electrical inputs of data interface 130. Data interface 130 is a conventional system driver card, which facilitates a data communication link between these elements and a motion control card within controller 112.

Although specific functions of microscope imaging system 100 are described in more detail in reference to FIGS. 2 through 5, the generalized operation of microscope imaging system 100 is described with reference to FIG. 1, as follows. A continuous supply of standard microscope slides that have a biological sample deposited thereon and which are stained with one or more chromogenic or fluorescent dyes is fed to the automated X, Y stage of microscope 110 via an infeed stage. These are subsequently positioned in the FOV of microscope 110. Additionally, during the transition from the in-feed stage of microscope imaging system 100 to the X, Y stage of microscope 110, the ID of the target microscope slide is read by barcode reader 116. The target slide is subsequently scanned at various resolutions and magnifications, based upon image processing algorithms and image analysis algorithms that are executed by controller 112. Upon completion of the image scan operation, the slide is transferred out of microscope imaging system 100 via an out-feed stage, the slide ID and image data for that particular slide are transmitted to controller 112 and stored in memory, and the motion control system moves the next target slide into the FOV of microscope 110. This process automatically repeats for each microscope slide that is automatically fed into microscope imaging system 100. It is noted that microscope imaging system 100 operates autonomously, e.g., a clinician initiates microscope imaging system 100 and, subsequently, microscope imaging system 100 operates automatically without human intervention, so long as a supply of microscope slides is available at its in-feed stage and no system errors occur. At any time, however, a clinician may view and/or manipulate the digital image of any given slide via controller 112 and display device 114 for the inspection and analysis of any given specimen, as is well known in anatomic pathology. This is possible because controller 112 reconstructs the image by using the image data that is associated with the contiguous FOVs and the image registration information.

Figure 2A:
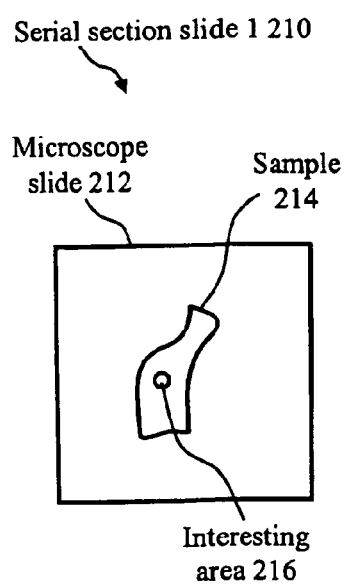
FIGS. 2A, 2B, and 2C illustrate an array of serial section slides that contain serial sections of tissue in accordance with an embodiment.
Figure 2B:
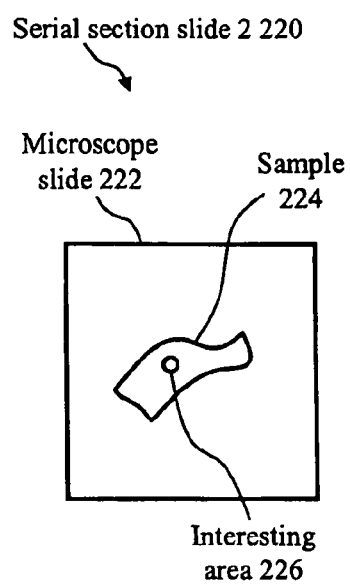
Figure 2C:
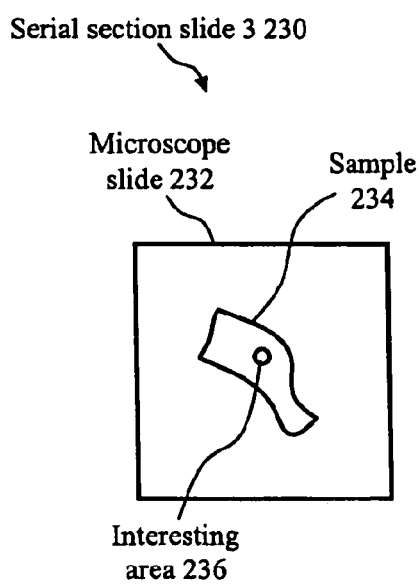

FIGS. 2A, 2B, and 2C illustrate an array of serial section slides that contain serial sections of tissue. FIGS. 2A, 2B, and 2C illustrate examples of common positional differences of tissue across a batch set of serial section slides. While a technician or machine responsible for placing tissue samples can do so relatively accurately across a set of slides, placement will never be completely accurate, especially when images at high magnifications are compared.

A serial section slide 1 210, a serial section slide 2 220, and a serial section slide 3 230 represent a batch of microscope slides arrayed with tissue samples and imaged by microscope imaging system 100. It is further understood that while three slides are shown, the batch may have a lesser or greater number of serial section slides. Each serial section slide: contains a microscope slide, as illustrated by the presence of a microscope slide 212, a microscope slide 222, and a microscope slide 232, which are conventional microscope slides formed of glass, for example, for use within microscope imaging system 100. Further, each micro, scope slide contains a sample, as illustrated by the presence of a sample 214, a sample 224, and a sample 234. A sample is representative of any serial section target specimen, such as a tissue sample that results from a needle biopsy or other tissue sample which has been sliced and mounted onto a series of slides by a technician or other individual. In FIGS. 2A, 2B, and 2C, a single sample is shown on each slide; however, it is understood that each serial section slide may contain more than one tissue sample arrayed across the slide.

An interesting area is also shown on each of the serial sections. This includes, in the figures, an interesting area 216, an interesting area 226, and an interesting area 236. An interesting area represents an area of a sample that has been deemed interesting based on a diagnostic characteristic of importance, such as, for example, color, size, or shape. This might be a section of a sample that appears darker because it is a tumor area that reacts to a stain, for example. The determination of an interesting area is often done by a pathologist or other user who reviews a captured and stored image of each serial section slide by use of display device 114 of microscope imaging system 100. Alternatively, an interesting area may be projected automatically by use of operating parameters, or a priori knowledge, described in more detail in reference to FIG. 3, about the test performed on the sample and the characteristics of what to look for as a result of the test. This automatic projection is a feature of microscope imaging system 100 and does not require user intervention.

With respect to serial section slide 1 210, it is to be assumed that sample 214 is placed in an acceptable orientation on microscope slide 212. Note that in FIGS. 2B and 2C, sample 224 and sample 234 are rotated to the right, with respect to sample 214. It is to be assumed that both sample 224 and sample 234 were intended to have the same orientation as sample 214 during placement on the slide. Also, sample 234 may be slightly larger than sample 214 and sample 224, as the tissue was stretched during placement on microscope slide 232. Furthermore, it is understood that any particular area of each serial section, such as interesting area 216, also will be misoriented across each sample.

Figure 3:
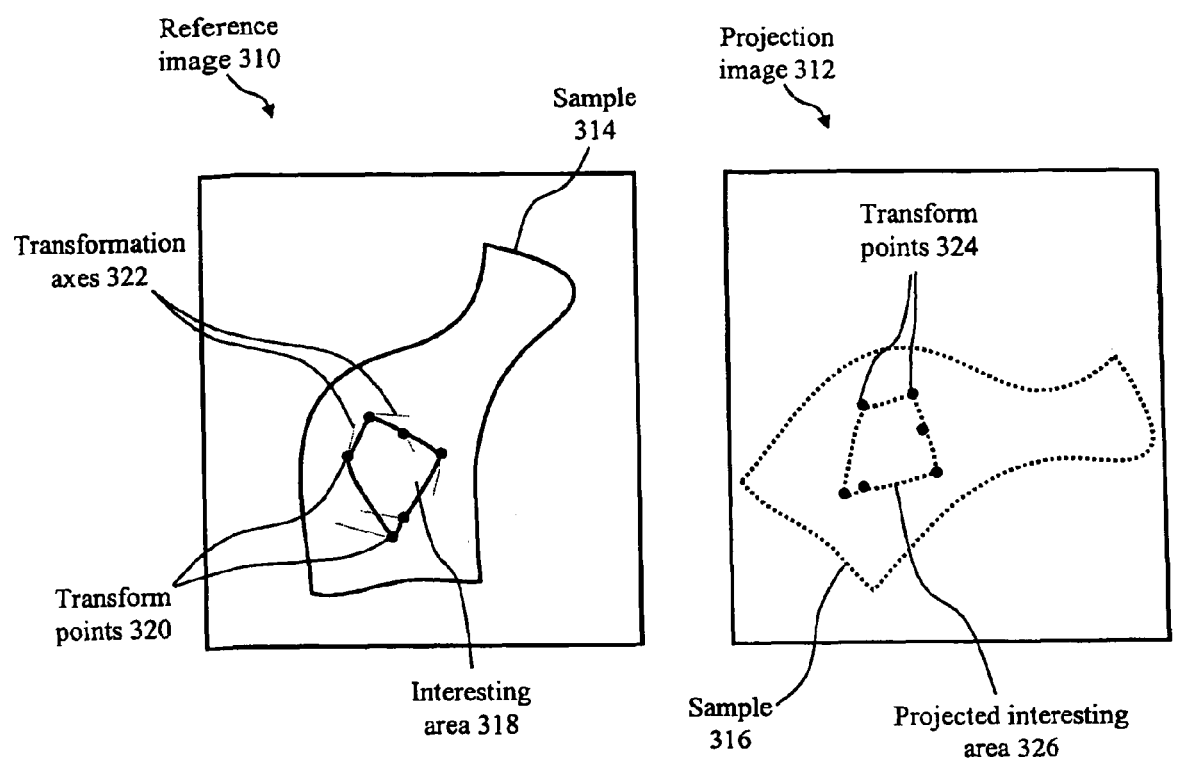
FIG. 3 illustrates a projection from a reference slide to a projection slide by use of a precalculated transform in accordance with an embodiment.

FIG. 3 illustrates a projection from a reference slide to a projection slide by use of a precalculated transform. A reference image 310 and a projection image 312 are shown, which represent two images of serial section slides taken by microscope imaging system 100. Reference image 310 and projection image 312 show a sample 314 and a sample 316, respectively, which are representative of two different serial section target specimens in a batch of serial section slides. An interesting area 318 may be determined by a user, such as a pathologist or clinician, who is reviewing a reference image 310, or by an algorithm running on microscope imaging system 100 and represents a region of sample 314 that has importance, such as diagnostic significance. Note that interesting area 318 is outlined by microscope imaging system 100 by use of a series of transform points 320. Transform points 320 represent the minimum number of locations along interesting area 318 necessary for calculating the actual outline of interesting area 318, and the number will vary depending on its shape. With respect to FIG. 3, six transform points are illustrated. A series of transformation axes 322 represent precalculated transforms, to which each transform point 320 should be projected, in order to find the same area on projection image 312. The resulting transform points are represented as a series of transform points 324, and the resulting projection is represented as a projected interesting area 326 on projection image 312. The preferred method for calculating the transformation of axes and for projecting an interesting area is described in more detail in reference to FIGS. 4 and 5.

Figure 4:
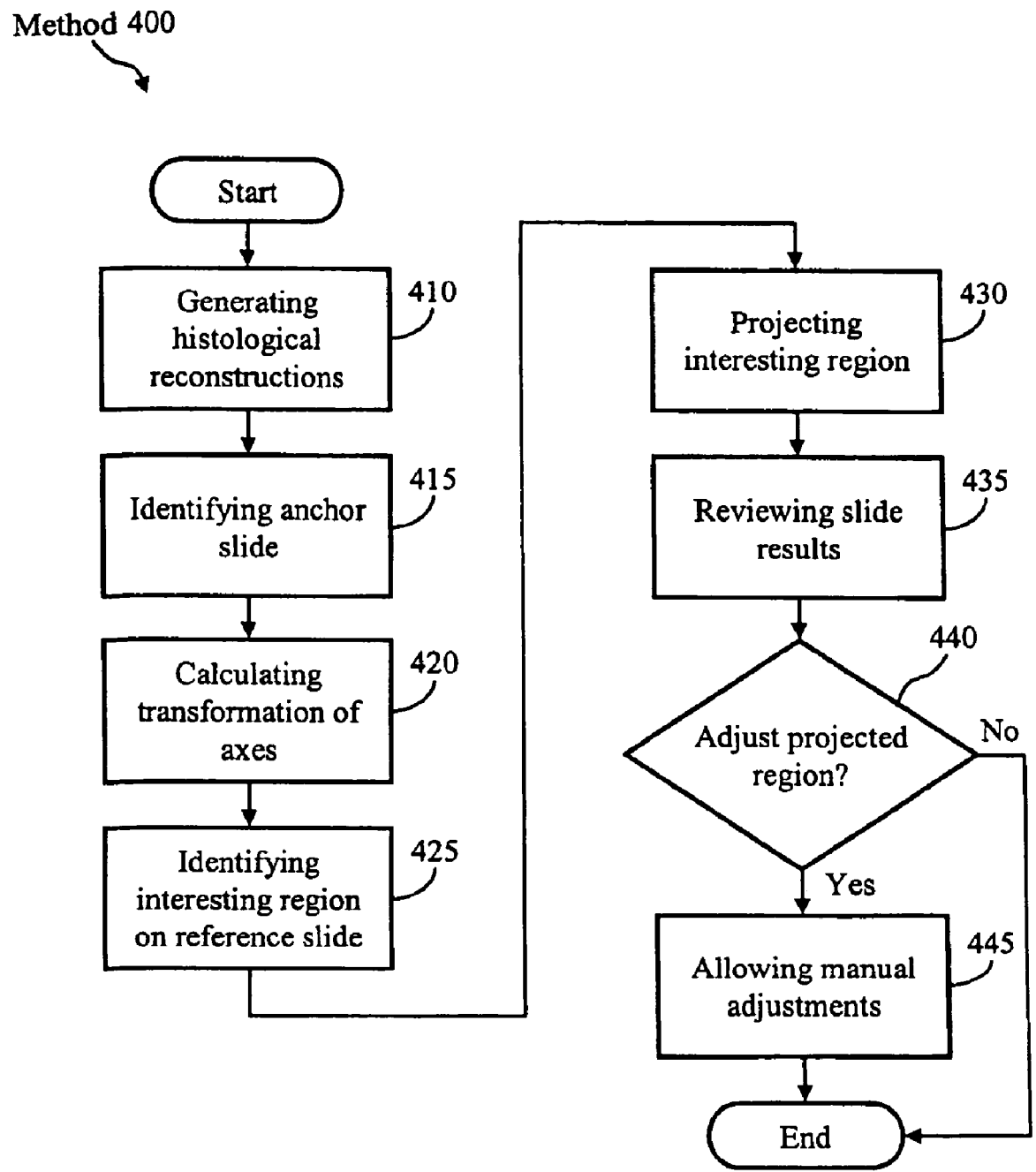
FIG. 4 illustrates a method of projecting a region of a serial section slide image to an array of related serial section slide images in accordance with an embodiment.

FIG. 4 illustrates a method 400 of projecting a region of a serial section slide image to an array of related serial section slide images.

Step 410: Generating Histological Reconstructions

In this step, microscope imaging system 100 images each slide in the serial section array at a low power and generates histological reconstructions, which are one or more low-power electronic images placed together to form a larger, composite image. While there are various methods of doing so, one specific example is described in reference to U.S. Patent Publication No. 2004/0202357, entitled, "Silhouette image acquisition", which is incorporated herein by reference. Histological reconstructions are stored in microscope imaging system 100 and outputted to a user via display device 114. Method 400 proceeds to step 415.

Step 415: Identifying an Anchor Slide

In this step, microscope imaging system 100 identities one slide in the serial section array as the "anchor slide". The initial anchor slide is the starting point for which all transformation of axes will be calculated. In an embodiment, the centermost slide in the array is determined to be the anchor. With respect to FIG. 2B, the anchor slide is shown as serial section slide 2 220. While any serial section slide could conceivably be chosen as the anchor slide, it is understood that the most accurate transformation of axes is calculated by beginning with the centermost slide in the serial section array. The transformation of axes calculation is described in more detail in reference to step 420. Method 400 proceeds to step 420.

Step 420: Calculating Transformation of Axes

In this step, microscope imaging system 100 calculates a transformation of axes for each slide in the serial section array. This may calculate, for example, multiple axis transformations for each slide.

Step 425: Identifying Interesting Region on Reference Slide

In this step, an interesting region is identified on one of the serial section slides, henceforth referred to as the "reference slide". The identification of this interesting region may be determined by a user, such as a pathologist or clinician, who is reviewing a histological reconstruction or montage of this reference slide via display device 114. The pathologist or clinician uses an input device (not shown), such as a mouse or a keyboard, to draw or designate one or more areas as interesting areas on the reference slide. Additionally, the interesting region may be determined by an automated procedure running on a computer on microscope imaging system 100. The interesting region may be determined based on color, size, shape, position, or another characteristic of the reference slide. Method 400 proceeds to step 430.

Step 430: Projecting Interesting Region

In this step, microscope imaging system 100 projects the interesting region of the reference slide to each subsequent slide in the serial section batch by use of the transformation of axes calculation, as determined in step 420. Rather than resample each slide in the serial section batch to align with the reference slide, which is a computationally-intensive calculation, microscope imaging system 100 uses the transformation of axes calculation to project the interesting region of the reference slide to each slide in the serial section and displays the projection.

Microscope imaging system 100 identifies the precalculated transform from step 420 for each slide in the serial section. If the precalculated transform is a global transform, the global transform is applied to a selected number of points of the interesting region. The number of points is determined based on the shape of the interesting region, which may be, for example, a circle, triangle, square, rectangle, or free form object. A global transform has the advantage of being faster. However, if a global transform is not calculated, microscope imaging system 100 calculates and uses a local transform for each point of the interesting region. The transform that is located the closest to each point is determined, and the interesting region is projected. Method 400 proceeds to step 435.

Step 435: Reviewing Slide Results

In this step, a user reviews the results of the projected interesting region(s) across one or more images. Microscope imaging system 100 outputs the resulting slide results to display device 114 for the user's review. Method 400 proceeds to step 440.

Step 440: Adjust Projected Regions

In this decision step, a user of microscope imaging system 100 determines whether to adjust the projected interesting region of one or more slides in the serial section array. Alternatively, the user may determine whether to change the original interesting region of the reference slide, in order to adjust the projected interesting regions of all slides. This allows a user to compensate for any projection miscalculations as a result of complex or unforeseen characteristics of the interesting region, as determined in step 425. If yes, method 400 proceeds to step 445. If no, method 400 ends.

Step 445: Allowing Manual Adjustments

In this step, microscope imaging system 100 allows a user to adjust manually the projected interesting region of one or more slides or the original interesting region of the reference slide. The pathologist or clinician uses an input device (not shown), such as a mouse or a keyboard, to draw manually and designate different interesting areas other than those projected. Method 400 ends.

Figure 5:
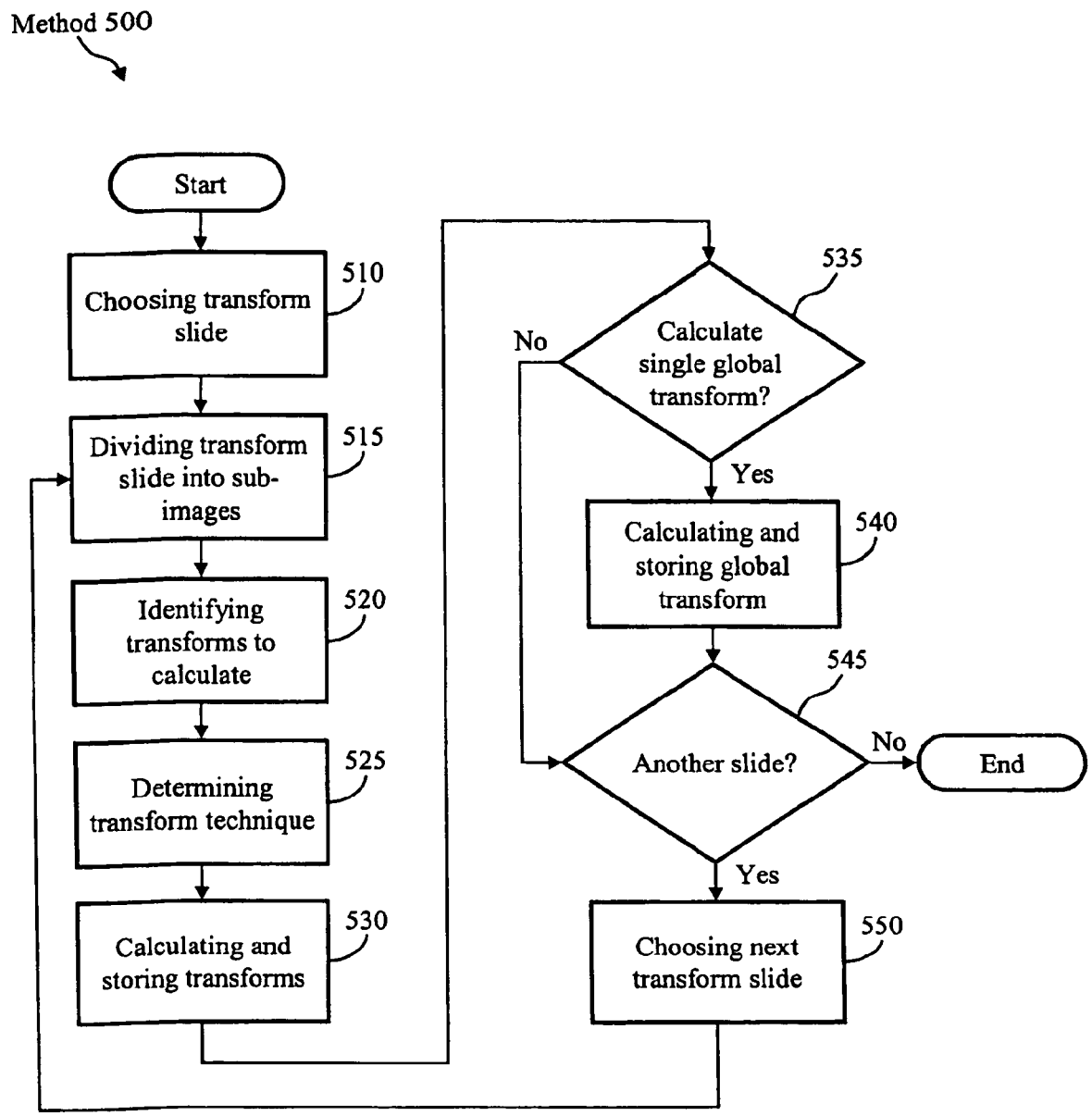
FIG. 5 illustrates a method of calculating the transformation of axes of an array of serial section slide images in accordance with an embodiment.

FIG. 5 illustrates a method 500 of calculating the transformation of axes of an array of serial section slide images.

Step 510: Choosing Transform Slide

In this step, microscope imaging system 100 chooses the first slide for which to calculate the transformation of axes. Typically, this is the serial section slide that immediately follows the anchor slide in the batch. However, in the case in which the anchor slide is the centermost slide in the batch, microscope imaging system 100 may also choose the serial section slide that precedes the anchor slide. The current slide in which to calculate the transformation of axes from the anchor slide is henceforth referred to as the "transform slide." Method 500 proceeds to step 515.

Step 515: Dividing Transfer Slide into Sub-Images

In this step, microscope imaging system 100 divides the transform slide into a series of sub-images that will be used to calculate the transformation of axes. The number of sub images needed will depend on the degree of stretching anticipated, alternatively the sub-images which resulted from collection could be used. It is understood that the actual image data that constitutes the subimages may already be obtained and stored in microscope imaging system 100 from an earlier process, such as a silhouette scan.

An alternative to dividing the transform slide into sub-images is to calculate the transforms by applying an algorithm to a region of the transform slide with the anchor slide. An example is provided in the method of calculating and utilizing a positional offset between a stored and captured image, in order to display an expected image. However, it is recognized that these two techniques are not optimal for matching two images that may have very large rotational differences or in cases in which the calculated offset is used to project a very large image area. Therefore, an embodiment requires microscope imaging system 100 to divide the transform slide into sub-images. Method 500 proceeds to step 520.

Step 520: Identifying Transforms to Calculate

In this step, microscope imaging system 100 determines the number of transforms to calculate for the current transform slide. Each transform is calculated by applying a transform technique to one or more of the sub-images. It is known that no stretching or tearing occurred then in principle 3 sub images are sufficient, in practice the number would be a selectable parameter which the user could adjust based on the quality of the slides. It should be recognized that the transform technique in step 525 may be determined first, as this may factor into the number of transforms to calculate. Method 500 proceeds to step 525.

Step 525: Determining Transform Technique

In this step, microscope imaging system 100 determines the technique to use for calculating each transform, as identified in step 520, of the current transform slide. This may be done using template matching, feature matching, or pattern recognition, for example. Method 500 proceeds to step 530.

Step 530: Calculating and Storing Transforms

At 530, microscope imaging system 100 executes the transform technique, as determined in step 520, to one or more of the sub-images, calculates the transformation of axes from the reference slide to the transform slide for each transform, and stores these transforms in memory.

The result of the calculation is a change in x-axis, a change in y-axis, and a change in rotation for each transform. Method 500 proceeds to step 535.

Step 535: Calculate Single Global Transform

535 determines whether microscope imaging system 100 should calculate a single, global transform, by using the calculated and stored transforms, as determined in step 540. Rather than project a region of interest by applying a local transform to each point of the area, a global transform is applied to the entire area. This global transform is used to project a region of interest from the current anchor slide to the current transform slide. If yes, method 500 proceeds to step 540. If not, method 500 proceeds to step 545.

Step 540: Calculating and Storing Global Transform

In this step, microscope imaging system 100 calculates and stores a global transform to use for projecting interesting regions to all serial section slides. The preferred calculation method involves taking an average change in x-axis, a change in y-axis, and a change in rotation across each transform, in order to calculate a global transform. Method 500 proceeds to step 545.

Step 545: Another Slide?

In this decision step, microscope imaging system 100 determines whether there is another slide in which a transformation of axes must be calculated, relative to an anchor slide. If yes, method 500 proceeds to step 550. If no, method 500 ends.

Step 550: Choosing Next Transform Slide

In this decision step, microscope imaging system 100 determines the next slide to calculate a transformation of axes. In the preferred embodiment of the embodiment, microscope imaging system 100 now identifies the previous "transform slide" as the "anchor slide", and again chooses the serial section slide that immediately follows in the batch as the new "transform slide." It is further understood that if transforms are calculated for the remaining slides in the batch and that the original anchor was the centermost slide; then transforms are then calculated for slides preceding the original anchor returns to step 515.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, while only a few kinds of transforms are described herein, it should be understood that other transforms, and any other form of image processing may be used for these slides.

The computers described herein may be any kind of computer, either general purpose, or some specific purpose computer such as a workstation. The computer may be a Pentium class computer, running Windows XP or Linux, or may be a Macintosh computer. The programs may be written in C, or Java, or any other programming language. The programs may be resident on a storage medium, e.g., magnetic or optical, e.g. the computer hard drive, a removable disk or other removable medium. The programs may also be run over a network, for example, with a server or other machine sending signals to the local machine, which allows the local machine to carry out the operations described herein.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method, comprising:

scanning a plurality of serial section slides with an automated imaging device to produce an image of each slide, each slide including a sample having at least one area related to a corresponding area of the sample of another one of the plurality of serial section slides;

using a computer to identify the related areas of the samples in each image; and using the computer to transform automatically a position of at least one of the related areas in at least one of the images based on the position of the related area in another one of the images, wherein said using the computer to transform automatically comprises dividing an image into a number of sub images, and determining a positional offset between different portions of the sub images.

2. A method as in claim 1, wherein said using a computer comprises identifying one of said serial section slides as an anchor slide, and transforming the images of other slides to have positions that are substantially aligned with the image of said anchor slide.

3. A method as in claim 1, wherein said transform comprises calculating an axial transform for at least one of said serial slides, and transforming the image of said serial slide along said axis, and displaying the transformed image along with the non-transformed image.

4. A method as in claim 1, further comprising allowing manual adjustments to at least one image after said using the computer to transform.

5. A method as in claim 1, wherein said using the computer comprises calculating a number of transformations of the image in advance, and using said transformations at a later time.

6. A method as in claim 2, wherein said transforming comprises identifying a shape in said anchor slide, and aligning said shape in the images of other slides with substantially the same shape in the image of said anchor slide.

7. A system, comprising:
an automated imaging device for scanning a plurality of serial section slides to produce an image of each slide, each slide including a sample having at least one area related to a corresponding area of the sample of another one of the plurality of serial section slides; and
a computer programmed with an algorithm for identifying the related areas of the samples in each image and automatically transforming a position of at least one of the related areas in at least one of the images based on the position of the related area in another one of the images, wherein said automatically transforming comprises dividing an image into a number of sub images, and determining a positional offset between different portions of the sub images.

8. The system of claim 7, wherein said algorithm further identifies an anchor slide, and changes the image of at least one slide other than said anchor slide to have the same orientation as the image of said anchor slide.

9. The system of claim 7, wherein said algorithm further identifies an anchor slide, and changes the image of at least one slide other than said anchor slide to have a specified part in the same position as said specified part in the image of said anchor slide.

10. The system of claim 8, wherein said algorithm calculates a plurality of coordinate transformations at a first time, based on said anchor slide, and uses at least one of said coordinate transformations at a second time, subsequent to said first time.

* * * * *

UNITED STATES PATENT AND TRADEMARK OFFICE
CERTIFICATE OF CORRECTION

| | | |
|---|---|---|
| PATENT NO. | : 7,873,193 B2 | Page 1 of 1 |
| APPLICATION NO. | : 11/472820 | |
| DATED | : January 18, 2011 | |
| INVENTOR(S) | : Jose De La Torre-Bueno et al. | |

It is certified that error appears in the above-identified patent and that said Letters Patent is hereby corrected as shown below:

Column 4, Line 51, please delete "1210" and insert --1 210--.

Signed and Sealed this
Fifteenth Day of November, 2011

David J. Kappos
*Director of the United States Patent and Trademark Office*